(12) United States Patent
Grose et al.

(10) Patent No.: US 6,724,309 B2
(45) Date of Patent: Apr. 20, 2004

(54) METHOD AND APPARATUS FOR TRACKING CARCASSES

(75) Inventors: Darren J. Grose, Witchita, KS (US); Howard G. Dolezal, Jr., Derby, KS (US)

(73) Assignee: Excel Corporation, Wichita, KS (US)

( * ) Notice: Subject to any disclaimer, the term of this patent is extended or adjusted under 35 U.S.C. 154(b) by 159 days.

(21) Appl. No.: 10/000,965

(22) Filed: Nov. 1, 2001

(65) Prior Publication Data

US 2002/0054940 A1 May 9, 2002

Related U.S. Application Data (60) Provisional application No. 60/245,891, filed on Nov. 3, 2000.

(51) Int. Cl.[7] .............................................. G08B 13/14
(52) U.S. Cl. ................................. 340/572.1; 340/572.8
(58) Field of Search .......................... 340/572.1, 572.4, 340/572.8, 573.1, 573.3, 10.1, 10.42, 10.52; 452/157, 158, 173; 235/375, 385

(56) References Cited

U.S. PATENT DOCUMENTS

| | | | |
|---|---|---|---|
| 1,395,333 A | 11/1921 | Bayerdorffer | 40/304 |
| 1,441,433 A | 1/1923 | Kisner | 40/304 |
| 1,956,974 A | 5/1934 | Bayerdorffer | 40/304 |
| 2,084,668 A | 6/1937 | Brooks | 40/304 |
| 2,163,016 A | 6/1939 | Barker | 40/304 |
| 2,341,608 A | 2/1944 | Gey | 40/304 |
| 3,803,801 A * | 4/1974 | Barth | 119/106 |
| 3,952,438 A | 4/1976 | Propst et al. | 40/300 |
| 4,155,886 A | 5/1979 | DeGoler | 260/17.4 R |
| 4,214,490 A | 7/1980 | Chizek | 81/9.22 |
| 4,228,685 A | 10/1980 | Wallace | 73/432 R |
| 4,280,813 A | 7/1981 | DeGoler | 8/404 |
| 4,313,271 A | 2/1982 | Bauer | 40/304 |
| 4,499,680 A | 2/1985 | Coburn | 40/304 |
| 4,512,096 A | 4/1985 | Heidecker | 40/304 |
| 4,597,495 A | 7/1986 | Knosby | 209/3.3 |
| 4,706,073 A | 11/1987 | Vila Masot | |
| 4,865,044 A * | 9/1989 | Wallace et al. | 340/573.1 |
| 4,909,250 A | 3/1990 | Smith | 606/117 |
| 4,914,843 A | 4/1990 | DeWoskin | 40/633 |
| 5,324,940 A * | 6/1994 | Ekstrom | 250/302 |
| 5,469,170 A * | 11/1995 | Mariani | 342/51 |
| 5,478,990 A | 12/1995 | Montanari et al. | 235/375 |
| 5,498,202 A | 3/1996 | Vande Berg | 452/184 |
| 5,869,341 A | 2/1999 | Woodaman | 436/1 |
| 5,964,656 A | 10/1999 | Lawler, Jr. | 452/173 |
| 5,973,600 A | 10/1999 | Mosher, Jr. | |
| 6,452,497 B1 * | 9/2002 | Finlayson | 340/572.8 |
| 6,545,604 B1 * | 4/2003 | Dando et al. | 340/572.1 |

FOREIGN PATENT DOCUMENTS

| WO | WO 00/13515 | 3/2000 |
|---|---|---|

* cited by examiner

*Primary Examiner*—Van Trieu
(74) *Attorney, Agent, or Firm*—Dorsey & Whitney LLP (57) ABSTRACT

An apparatus and method for identifying a carcass during meat production. In one embodiment, the apparatus includes a band sized to fit around a limb of the carcass and a readable identification tag affixed to the band for remote identification of the carcass. In another embodiment, the apparatus includes a block adapted to couple to a trolley carrying the carcass and a readable identification tag coupled to or embedded in the block. The readable identification tag may be used to read and write information relating to the carcass to a database.

34 Claims, 10 Drawing Sheets

METHOD AND APPARATUS FOR TRACKING CARCASSES

CROSS-REFERENCE TO RELATED APPLICATION(S)

This application claims priority from U.S. Provisional Patent Application No. 60/245,891, filed Nov. 3, 2000, which is hereby incorporated by reference in its entirety.

BACKGROUND OF THE INVENTION

This invention relates generally to food processing, particularly meat processing and tracking carcasses during meat production. More particularly, the invention relates to methods and devices for identifying and tracking a carcass on a production line during commercial meat production.

During commercial meat production, a beef carcass is subjected to a number of different procedures. The animal is first slaughtered, its hide is removed from the carcass, and the carcass is washed. The carcass may also be steam pasteurized, and the carcass may also be subjected to an electrical stimulation process. During commercial meat production, the carcass may be attached to a trolley or shackle at different points in the meat processing line. The carcass then travels along the meat processing line and is subjected to a number of processes, including those identified above as well as weighing of the carcass and removal of the some portions of the carcass. The carcasses are also inspected at a number of locations along the meat processing line, and certain information regarding carcasses may be recorded at the inspection locations. In addition, portions of the carcass that have been removed, such as the viscera, may be inspected to ensure that the animal was healthy at the time of slaughter During commercial meat production, it is common to track and identify meat carcasses while on the meat production line. Carcasses are tracked for a variety of reasons, including to monitor the efficiency of the meat production facility and to identify and monitor carcasses to ensure that meat has been safely handled and processed. In addition, carcasses may be tracked during meat production so that certain information may be accumulated and maintained while the carcass is in the meat production facility. This information may include the weight of the carcass, the specific type of animal from which the carcass was derived, data about the source of the animal (e.g., breeder, ranch location, etc.), and any other information that may be tracked for the carcass. This information may be used for a variety of purposes, including ensuring that meat has been properly aged, aiding in sorting carcasses before the carcasses are broken down into meat products for packaging, and tracking carcass information back to the producer of the animal or tracking carcass information from the farm to the packaged meat. In addition, information about carcasses that impact the price of the meat, such as quality and cutability, may be collected at different locations in the plant.

Meat producers have therefore instituted tracking systems in meat processing plants. By having a unique identifier for each carcass that enters the meat processing line, the carcasses may be tracked such that it can be determined that each carcass has been subjected to each procedure on the meat processing line (e.g., steam pasteurization, washing, and trimming).

Tracking systems known in the prior art and commonly used in the meat processing industry have a number of disadvantages. Some of these disadvantages are related to the adverse environment of a meat processing plant. Vision-based systems or trolley readers, which are frequently used in meat processing plants, often are difficult to maintain. The TrolleyVision® system by Automated Systems Technologies & Design is an example of one such vision-based system. Some vision-based systems use a hole pattern design engraved or attached to a shackle, which may be attached to an animal carcass while on the meat processing line. Such vision-based systems may become covered or clogged with particles from the meat production facility and may therefore require a substantial amount of cleaning or maintenance. Another disadvantage with such a tracking procedure is that the identification system is typically on the shackle or trolley that is attached directly to the carcass. Some meat production facilities use an intermediate captive trolley or shackle, and, in such systems, the animal carcass may be removed from a first trolley or shackle and transferred to a second trolley or shackle along the production line. The tracking system itself or information captured about the carcass while the carcass is attached to the first trolley or shackle, therefore, will need to transferred to the second trolley or shackle after the transfer of the carcass. In meat production facilities using such a system, it may therefore be obtrusive and inefficient to carry identification information on a shackle or trolley.

Identification systems that attach identification information directly to the carcass with a pin are also known in the prior art. A tag or label with a bar code to be used as an identification system, for instance, could be pinned directly to the carcass. Such systems, however, have the disadvantages of being inordinately time consuming to attach and there is a possibility that the pin may separate from the carcass during processing, causing the carcass to lose its identification. Because of the harsh environmental conditions in a meat processing facility, such as varying temperatures, moisture, air currents, and mechanical shock, a portion of the identifications for carcasses may be lost during meat processing if this procedure is used.

A need exists in the art for methods and devices for identifying and tracking carcasses during commercial meat production that are convenient, efficient, reliable and easy to maintain.

BRIEF SUMMARY OF THE INVENTION

One embodiment of the present invention is an apparatus for identifying a carcass during meat production. In this embodiment, the apparatus may comprise a band sized to fit around a limb of the carcass and a readable identification tag coupled to the band for remote identification of the carcass. In one embodiment, the readable identification tag may be a radio-frequency identification ("RFID") tag or a bar code identification. In another embodiment, the apparatus may comprise a band sized to fit around a gambrel used to support the carcass, and a readable identification tag coupled to the band for remote identification of the carcass.

Another embodiment of the invention is an apparatus for identifying a carcass during meat production, wherein the apparatus comprises a plastic strip formed into a ring sized to fit around a limb of the carcass, and an RFID tag coupled to the plastic strip for remote identification of the carcass. Another embodiment of the present invention is a block adapted to removeably engage the trolley, and an RFID tag coupled to or embedded in the block for remote identification of the carcass.

Another embodiment of the invention is a method for identifying a carcass during meat production. In this embodiment, the method comprises placing a band around a limb of the carcass, wherein the band includes an RFID tag, and reading identification information from the RFID tag with an RFID tag reader. In another embodiment, the method includes attaching a block, which includes an RFID tag, to a trolley, and reading or writing identification information from the RFID tag with a read/write device.

Another embodiment of the present invention is a method for reusing an RFID tag. In this embodiment, the method includes clearing any writable memory on the RFID tag and verifying that the tag remains operational prior to placing the tag on the next carcass in the production line. Another embodiment of the present invention is a method of tracking carcass information using an RFID tag. In this embodiment, the method includes storing predetermined critical information in the memory located in the RFID tag.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
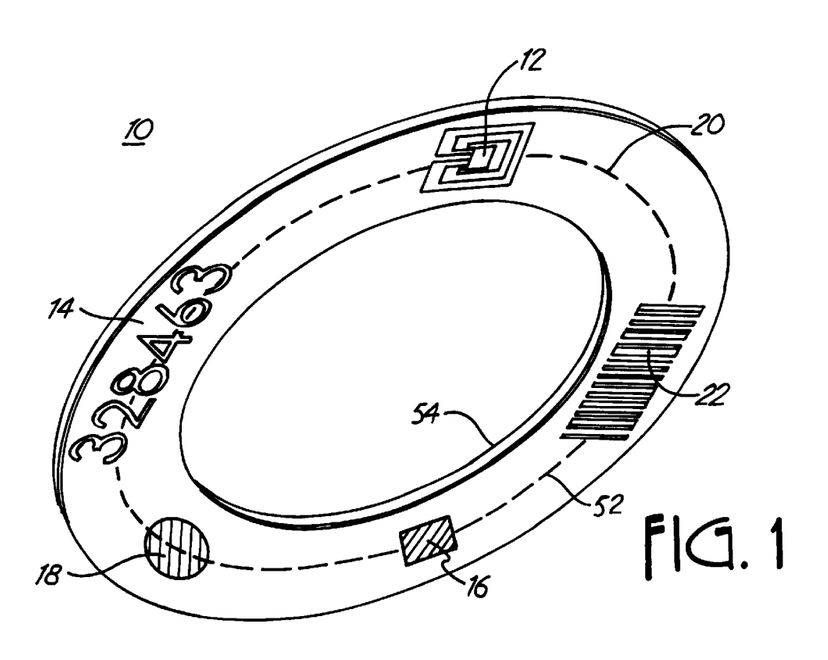
FIG. 1 is a perspective view of the band of one embodiment of the present invention.
Figure 2:
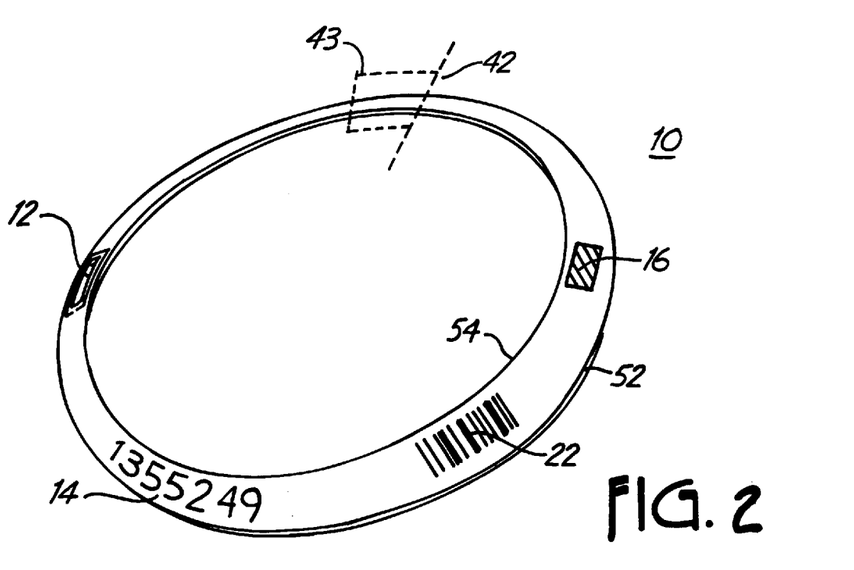
FIG. 2 is a perspective view of a second embodiment of the band of the present invention.
Figure 3:
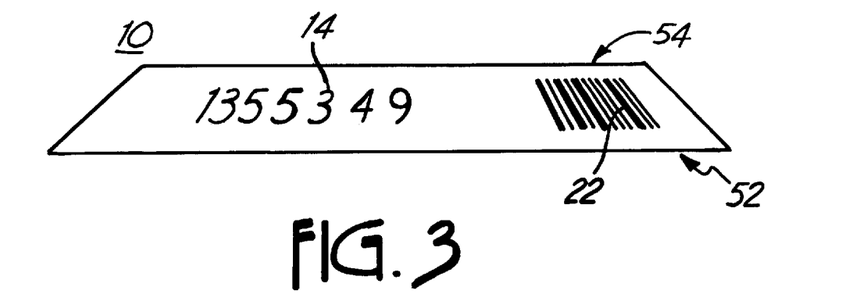
FIG. 3 is a side view of the band of the embodiment of FIG. 2.

In general, as shown in FIGS. 1–3, one embodiment of the present invention includes a band 10 with a readable identification tag attached. The readable identification tag may be a radio frequency identification ("RFID") tag 12, a bar code identification 22, a combination of an RFID tag 12 and a bar code identification 22, or some other identification device as is commonly used by those skilled in the art. In one embodiment, the RFID tag 12 is permanently attached to the band 10. In another embodiment, the RFID tag 12 is removeably attached to the band 10. The RFID tag 12 is also known as an electronic label, a transponder, or a code plate.

The band 10 may be placed over a limb or other portion of a carcass or over a gambrel attached to the carcass during meat processing, and the carcass may then be identified or tracked during meat processing through reading of the RFID tag 12 or bar code identification 22 with one or more RFID tag readers, scanners, or bar code readers. The term "band" is intended to mean and encompass a generally ring-like oval or annular structure or a collar of any other geometry, whether generally rigid or flexible and whether continuous, substantially continuous, or comprising a length of material with two ends adapted to be coupled together. Throughout this specification, the term "carcass" will be used to refer to the corpse of a slaughtered animal, and may include a whole corpse of the animal or a side of the animal that results from splitting a whole carcass into two sides.

Figure 4:
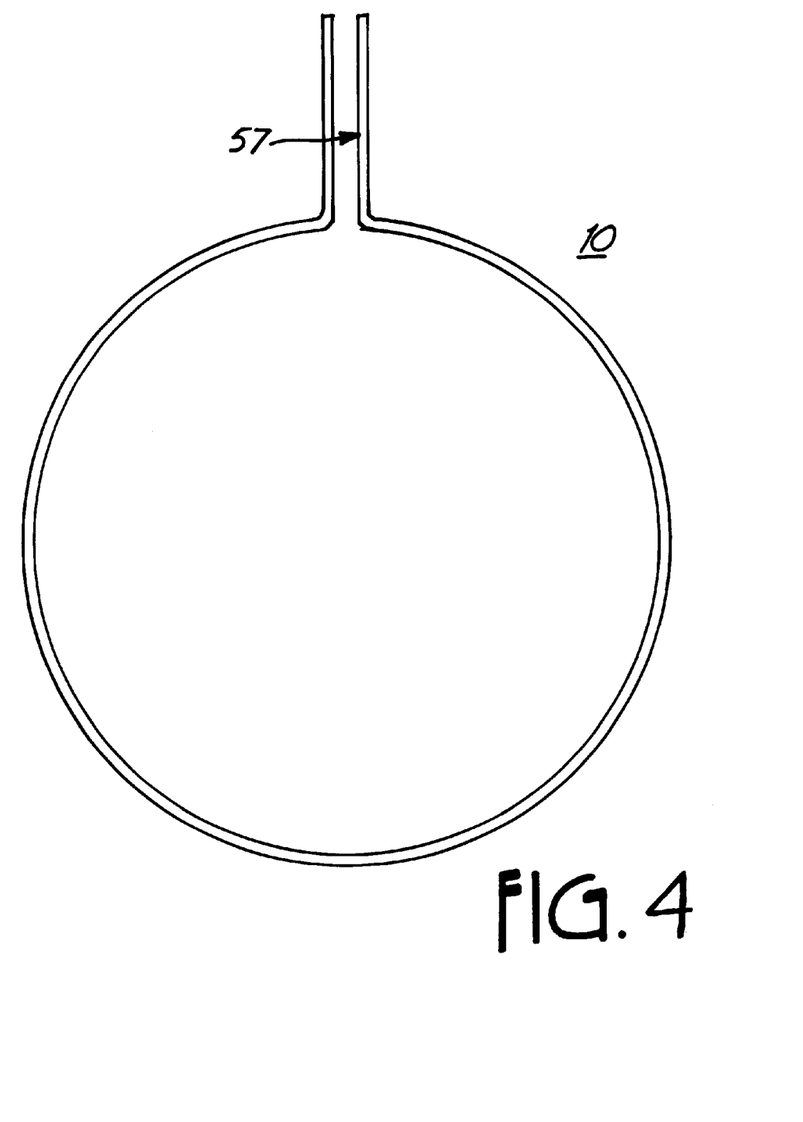
FIG. 4 is a top view of a third embodiment of the band of the present invention.
Figure 5:
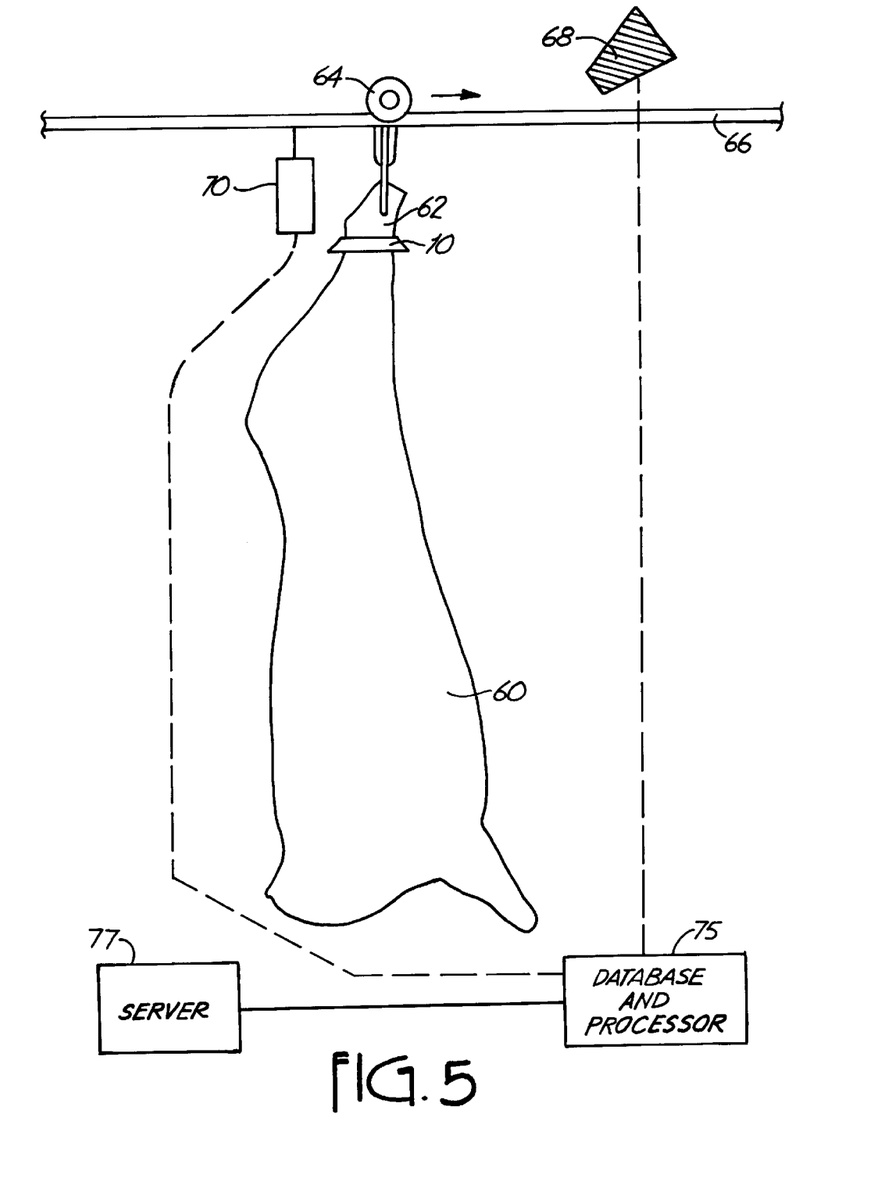
FIG. 5 is a side view of a carcass on a meat processing line during use of one embodiment of the invention.

In one embodiment, the band 10 is sized to fit around a limb of a carcass 60, as is shown in FIG. 5. In one embodiment, the band 10 is a long, substantially continuous, one-piece narrow strip that is formed into a ring in the shape of the band 10, as shown in FIG. 4. The band 10, or the strip from which it may be made, may be made from any type of material known to those skilled in the art that is suitable for use in a commercial meat production facility, and the band 10 may be rigid or flexible. In one embodiment, the band 10 is made from an elastic material or includes an elastic portion to assist in securely coupling the band 10 to the carcass 60. Suitable materials may include any variety of plastic, laminated resins or composite materials or phenolic, laminated paper, stainless steel or metallic alloys, and fiberglass. In one embodiment, the strip, or the band 10, may be made from a plastic material that is able to withstand the range of temperatures, chemicals, and harsh environmental conditions of a meat production facility. Suitable plastics may include materials that are safe for food contact, such as polyethylene, acetyl, or nylon. The band 10, for instance, in one embodiment, is sufficiently durable to withstand steam pasteurization and other high temperature processes. In one embodiment, the band 10 is cleanable and suitable for repeated use. In another embodiment, the band 10 is disposable.

In one embodiment, the band 10 is sized to fit around a limb of the carcass 60, such as a hind leg 62 of the carcass 60 (as shown in FIG. 5). Although the size of the band 10 may vary depending upon the animal for which it may be used, in an embodiment to be used with beef carcasses, the band 10 has an inside diameter of approximately five to eight inches. In one embodiment, the strip from which the band 10 is made is about one and one-half inches in width and is approximately one-sixteenth to one-eighth inch in thickness. The width and thickness of the band 10, however, may also vary within the scope of the invention. In one embodiment, the band 10 is made from a flourescent-colored material, such as a bright green, orange, or yellow plastic.

FIG. 1 depicts a first embodiment of the band 10 of the present invention. In this embodiment, the band 10 is of a flat shape, and is generally in the shape of a circular ring with a generally central opening. The band 10 has an annulus or inside ring selectively sized to fit over a limb or other portion of an animal carcass 60. In one embodiment, the opening is disposed off-center to, for example, cause the band 10 to rest is a desirable orientation when it is placed on the carcass 60.

In a second embodiment, as may be seen in FIGS. 2 and 3, the band 10 has a slight frusto-conical shape, such that the diameter of the band 10 at one side of the band 10 is greater than a diameter at a second side of the band 10. Referring to FIG. 3, for instance, a first side 52 (an outer or upper edge)

of the band 10 has a greater diameter than a second side 54 (an inner or lower edge) of the band 10. A band 10 in such a frusto-conical shape may fit more smoothly upon a limb of a carcass 60 than bands 10 of differing shapes, although bands 10 of any shape may be used within the scope of the invention. In addition, a frusto-conical shape may facilitate stacking of bands 10 when the bands 10 are not in use. In the embodiment of FIGS. 2 and 3, the band 10 is circular in shape (see FIG. 2), although the band 10 may also be shaped as an oval, square, or in some other geometry that may allow the band 10 to be placed over a limb or other portion of a carcass 60.

In another embodiment, shown in FIG. 4, the band 10 is a strip of material, such as a laminated paper, that may be wrapped around a limb of a carcass 60 and then fastened into a loop at a portion 57 of the strip that has adhesive attached thereto. This embodiment allows the band 10 to be attached to a portion of the carcass 60 that does not have an open end.

The inner edge 54 (FIGS. 1 and 3) of the band 10 may define a generally central opening of the band 10. The outer edge 52 may be generally concentric or congruent to the inner edge 54 and may form an outer peripheral edge of the band 10, as seen in FIGS. 1–3. In the embodiment of FIG. 1, the inner edge 54 of the band 10 may contact the carcass limb or portion over which the band 10 is placed. In the embodiment of FIGS. 2 and 3, in which the band 10 has a generally frusto-conical shape, the band 10 may self-tighten over a limb or portion of the carcass 60, helping it to stay in place and enhance its stability for electronic reading. For instance, as may be seen in FIG. 3, an embodiment of the band 10 having a generally frusto-conical shape may be conducive to orienting itself such that it may be easily read by readers (numerals 68 and 70 in FIG. 5) along a commercial processing line, because the outer side of the band 10 is disposed at an acute angle to the track.

The band 10 is, in one embodiment, in the shape of a closed loop, as shown in FIGS. 1–3. Such a loop may be generally circular, although it may also be of varying shapes, as discussed above. In other embodiments, the band 10 is shaped as a loop with an opening 42 therein. For instance, the band 10 may have an open portion 42, or may be pulled apart, such that it may be placed upon a limb of a carcass 60 after the limb has been attached to a trolley or shackle. In a closed loop embodiment, the band 10 may need to be placed over the limb or other portion of the carcass 60 before the shackle or trolley is attached to the limb or other portion. In an embodiment using an open loop (shown in FIG. 4), on the other hand, the band 10 may be attached to the carcass 60 after a limb of the carcass 60 has been attached to a trolley or shackle. The open loop may then be connected to form a single loop. In one embodiment, the band 10 is a length of material having two ends adapted for coupling with one another to form a closed loop. In this embodiment, the ends may be coupled using any method known to those in the art, including using buckles, velcro, and snaps. FIG. 2, for instance, shows in a broken line form (numeral 42) the possibility that the band 10 may not be continuous in one embodiment, but may instead be an open loop with an overlapping portion (numeral 43) that couples the band 10 together.

Figure 6:
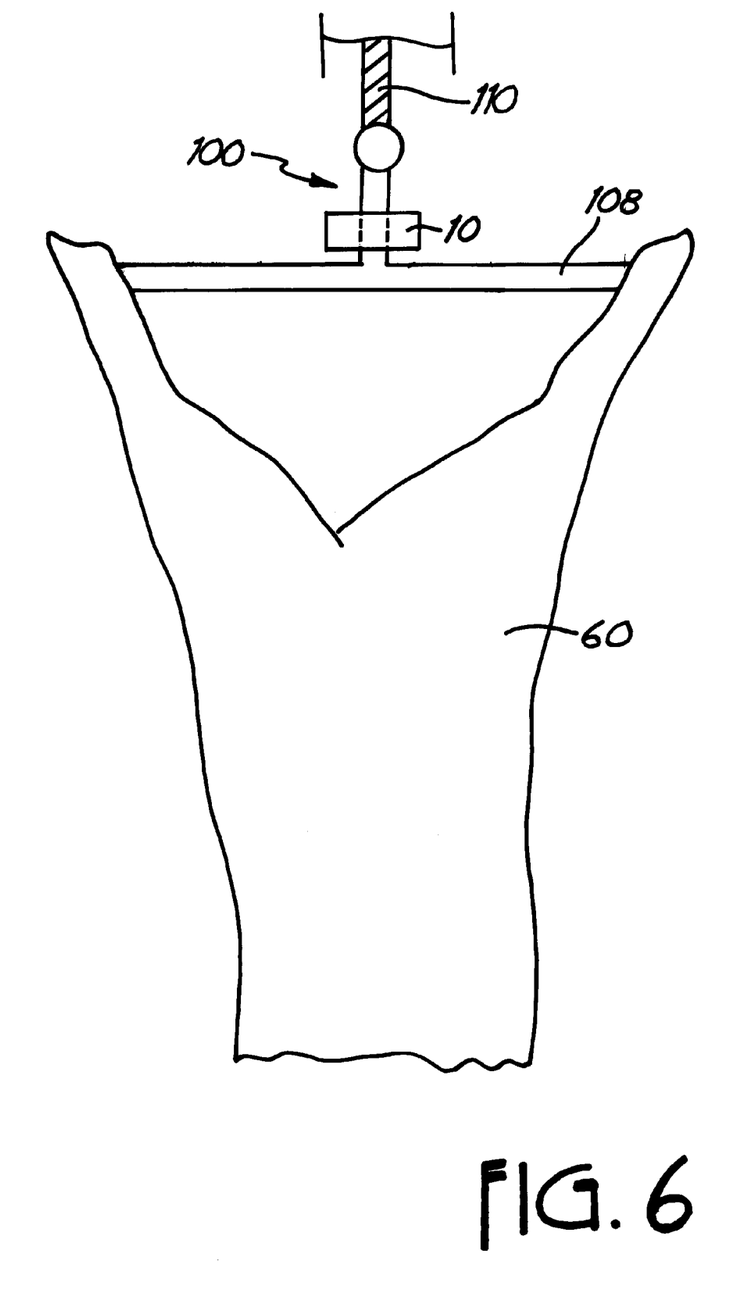
FIG. 6 is a perspective view of a hog carcass attached to a gambrel along a meat processing line, including a band according to a fourth embodiment of the present invention.

FIG. 6 depicts a gambrel 100 that may be used for suspension of carcasses 60 during commercial hog production. In general, the gambrel 100 may be attached to the legs of the hog carcass 60 and may be attached to a trolley such that the hog carcass 60 and gambrel 100 move along the meat processing line. In hog production, the hog carcasses 60 are typically not split completely into two separate carcass halves, and a gambrel 100 is therefore used for suspension of the carcass 60 rather than the trolley system used for commercial beef production. As further shown in FIG. 6, the gambrel 100, includes a cross bar 108 and a top bar 110. FIG. 6 also depicts the placement of the band 10 over the gambrel 100 during use of this embodiment of the invention. As shown in FIG. 6, the band 10 is placed over the top bar 110 of the gambrel 100, although in other embodiments the band 10 could be placed over the cross bar 108 of the gambrel 100.

Figure 7:
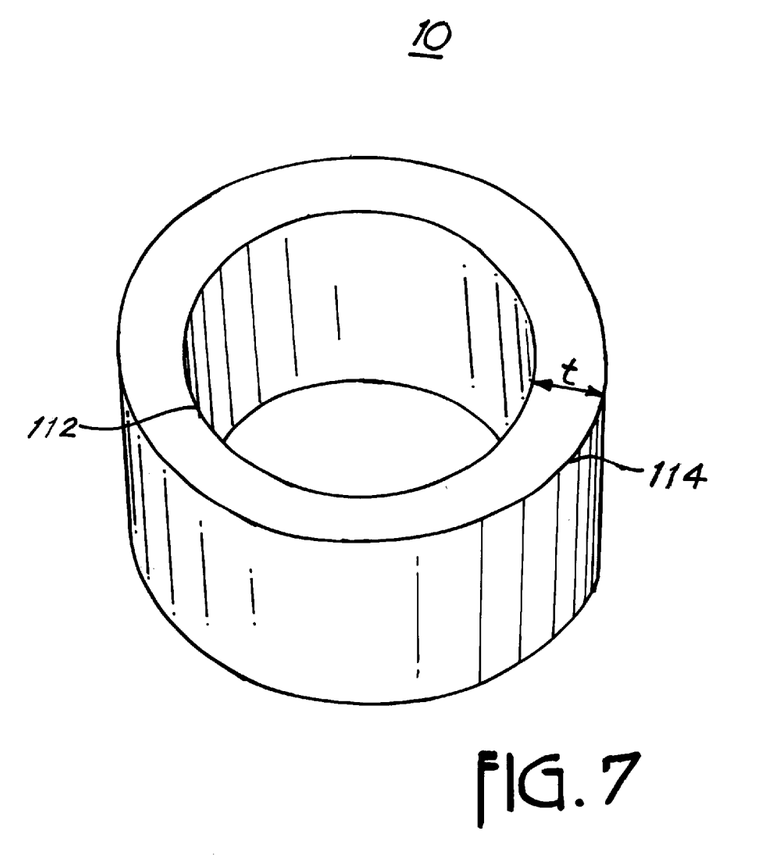
FIG. 7 is a perspective view of the band according to the fourth embodiment of the band of the present invention.

Although any of the bands 10 described above may be used for commercial hog production and may be placed over the limb of the hog carcass 60 for use, in other embodiments, a band 10 sized to fit the gambrel 100 may be used. FIG. 7 depicts one embodiment of a band 10 sized to fit over a gambrel 100, and such a band 10 may be suitable for use during commercial hog production. The band 10 depicted in FIG. 7 may be made from any of the materials described above. In one embodiment, the band 10 is made from a material that can withstand high temperatures (such as phenolic), which are frequently experienced during commercial hog production, such as when hair is singed from the hog carcass 60. The band 10 depicted in FIG. 7 has a thickness t between an inside edge 112 and an outside edge 114 of the band 10. The band 10 of FIG. 7 may have any or all of the features described above, including an RFID tag 12 and a bar code identification 22.

Figure 8:
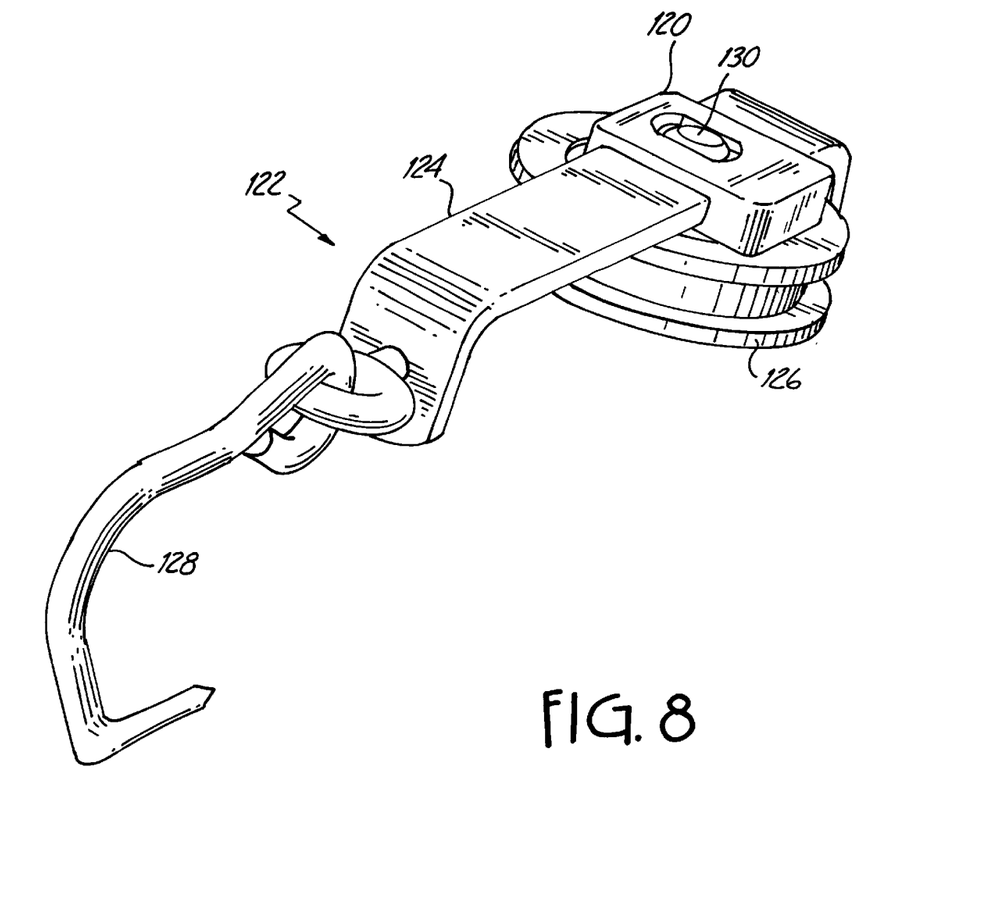
FIG. 8 is a perspective view of a block, including an RFID tag, coupled to a trolley, according to a fifth embodiment of the present invention.
Figure 9:
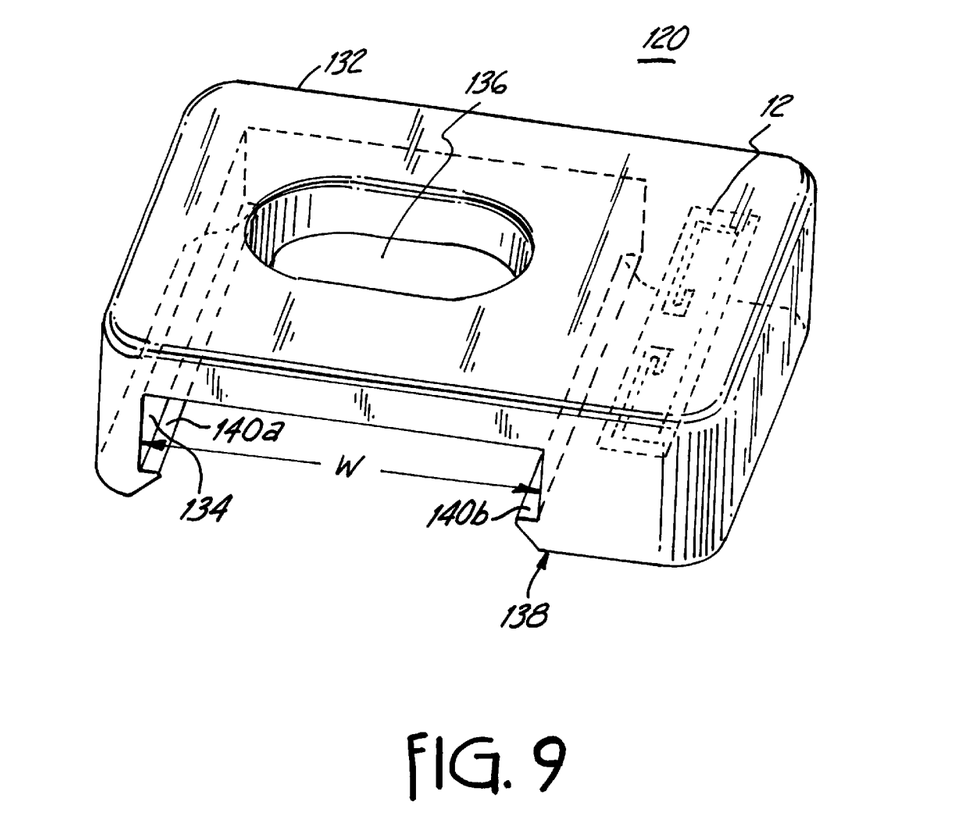
FIG. 9 is a perspective view of the block shown in FIG. 8.

FIG. 8 shows another embodiment of the present invention. In this embodiment a block 120, which contains an RFID tag, engages a trolley 122. As shown, the trolley 122 includes a frame 124, a roller 126 and a hook 128. The roller 126 is coupled to the frame 124 using an axle 130. As shown in FIG. 8, the block 120 engages the frame 124 and includes an opening adapted to accept the an end of the axle 130. FIG. 9 shows a perspective view of the block 120. As shown in FIG. 9, the block 120 includes a housing 132 and an RFID tag 12. The housing has a trolley notch 134 and an opening 136. In the embodiment shown in FIG. 9, both the trolley notch 134 and the opening 136 are disposed closer to a first end than to a second end of the housing 132. This design leaves sufficient room at the second end for embedding the RFID tag 12. As shown, the opening 136 is generally centered along a lateral dimension of the housing 132 and is adapted to accept the axle 130 of the trolley 122, as shown in FIG. 9. The trolley notch 134 has a width (shown as "w" in FIG. 9) approximately equal to a width of the trolley 122. The trolley width will vary depending on the manufacturer of the trolley and the species of animal it is intended to support.

As further shown in FIG. 9, near a bottom face 138, the trolley notch 134 includes two fingers 140*a* and 140*b*, which extend laterally across the housing 132. The fingers 140*a* and 140*b* also slightly extend toward one another. As shown, a bottom surface of the fingers 140*a*, 140*b* is angled toward the trolley notch 134. This angle allows an operator to connect the block 120 to the trolley 122, by applying a force to the block 120 sufficient to cause the fingers 140*a*, 140 to separate a sufficient distance to allow the frame 124 to engage the trolley notch 134. Once the frame 124 fully engages the trolley notch 134, the fingers 140*a*, 140*b* close, locking the block 120 to the trolley 122. In one embodiment, a supplemental fastener (e.g., bolts, screws, rivets, and adhesives) is also used to couple the block 120 to the trolley 122. Furthermore, the opening 136 accepts the axle 130 of the trolley 122, which acts to prevent the block 120 from sliding longitudinally along the frame 124. In one embodiment, the block 120 may be made from a plastic material that is able to withstand the range of temperatures, chemicals, and harsh environmental conditions of a meat production facility. Suitable plastics may include materials such as polyethylene, acetyl, polypropylene, nylon, or other engineered resins.

In another embodiment of the present invention, the opening 136 is located at the approximate center of the block 120, and the housing 132 is adapted to accept a second RFID tag 12. In one embodiment, the housing 132 does not have an opening. In one embodiment the fingers 140a, 140 extend completely across the lateral dimension of the housing 132. In another embodiment, the fingers 140a, 140b extend only partially across the lateral dimension. In one embodiment, the housing 132 is formed or molded around the RFID tag 12. In another embodiment, the housing 132 includes a pocket sized to accept and secure the RFID tag 12.

In the embodiments of the invention containing an RFID tag 12, the RFID tag 12 may be coupled to the band 10 or block 120 and used for remote identification of the carcass 60. The RFID tag 12 may be of any variety known to those skilled in the art, and is sized such that it may be embedded in the band 10 or block 120 without protruding significantly. The RFID tag 12 may be affixed to the band 10 or block 120 in any manner known to those skilled in the art, such as through the use of adhesives, pins, or embedding technology.

RFID tags known in the art can generally be placed into two categories, based on the method of powering the tags. The first type of RFID tag is a passive tag, and the second type is an active tag. Passive tags do not include a built-in power source, but instead draw energy from an external electromagnetic field using a coil. Active tags include an on-board energy source. Either type of RFID tag may be used with the present invention. RFID tags know in the art can also be placed into two categories, based on the reading and writing capabilities of the tag. The first type of RFID is a read-only tag. This type of tag generally contains a preset identification number and cannot store any additional information. The second type of RFID tag is a read-write tag. A read-write tag generally contains a preset identification number, but also includes some writable memory. RFID tags can also be placed into various categories, based on operating frequencies. For example, ear tags used in live animal tracking are typically in the range of 125 kilohertz, which is good for tracking non-metal objects. RFID tags currently extend up to 2.45 gigahertz. In general, the higher the frequency, the shorter the antenna required, and therefore the smaller the package required for the tag. In one embodiment, frequencies of 13.56 megahertz and 2.45 gigahertz both function adequately for purposes of the present invention, but most other frequencies can also be made to work effectively.

Although any type of RFID tag 12 may be used, in one embodiment a foil RFID tag, as is commonly used in embedding applications, may be used as the RFID tag 12 in the invention. One suitable RFID tag 12 may be a tag-it inlay made by Texas Instruments. Another suitable RFID tag 12 may be a coil RFID tag made by Texas Instruments. The RFID tag 12 may be used to store any information relating to the carcass 60, such as the carcass weight, the type of animal, the time of slaughter, and the identification number for the carcass 60. An RFID tag 12 is a type of data collection technology that uses an electronic tag to store identification data, and a wireless transmission method that may be used for data capture from the electronic tag. If the RFID tag 12 is a passive tag, it may get its power from the RFID tag reader or scanner that is used to read the data on the RFID tag 12.

In one embodiment of the present invention, the RFID tag 12 is a read-only tag. In this embodiment, the identification number contained in the RFID tag 12 is read at various locations along the meat processing line where additional information relating to the carcass is gathered. The information and identification number are then transmitted to a computer system for storage, as explained in greater detail below. In another embodiment, the RFID tag 12 is a read-write tag. Read-write tags that will work with the present invention include IntelliTag® Series from Intermec Technologies Corporation and the HMS-100 Series passive read-write tags available from Escort Memory Systems. In this embodiment, the information gathered is transmitted to the computer system for storage and, additionally, some key information is stored in the memory located on the RFID tag 12, as explained in more detail below. Storage of a portion of the information directly on the RFID tag 12 facilitates compliance with USDA requirements that certain critical information be present on the carcass.

In one embodiment of the invention, the band 10 or block 120 may contain a bar code identification 22 that may be read by a bar code reader (as may be seen in FIG. 5). The bar code identification 22 may be any type of bar code commonly used by those skilled in the art, including one-dimensional bar codes and two-dimensional bar codes. A bar code is a pattern of bars of various widths and with varying spaces that may be printed on paper or other suitable material for recognition by a bar code scanner or bar code reader. The bar code scanner or bar code reader uses a laser beam or light source and a photocell, which reads the light reflected from the bar code. Any type of bar code and bar code scanner may be used which is known to those skilled in the art. Such bar code scanners commonly may be placed within close proximity to the bar code identification 22 to read the information from the bar code identification. An RFID tag 12, on the other hand, may typically be read from a greater distance than a bar code identification 22. Bar code 128 is one possible type of bar code that may be used within the scope of the invention, and such a bar code could be read using a Symbol Model P360 bar code reader.

In addition to the RFID tag 12, the band 10 or block 120 may also contain a variety of other components. In one embodiment, the band 10 or block 120 contains a visible number 14, as shown in FIGS. 1–3. This visible number 14 may be used for a simple visual identification of a carcass 60 by workers in the meat production facility. The band 10 or block 120 may also contain one or more sensors that may be used during the meat production process. In one embodiment, for instance, the band 10 or block 120 contains a temperature sensor 16, which may be attached or embedded in the band 10 or block 120 and which may be a wireless temperature sensor. In other embodiments, the band 10 or block 120 contains a sensor 18 that may be used for the detection of an ambient condition adjacent the carcass 60, such as humidity. Such an ambient condition sensor 18 may also be embedded in the band 10 or block 120 much like the temperature sensor 16 or the RFID tag 12. In another embodiment, bio-sensors and air quality sensors are affixed to the band 10 or block 120.

In one non-metallic embodiment of the band 10 or block 120, the band 10 or block 120 contains a wire loop 20 to facilitate detection by a metal detector. The wire loop 20 may be embedded in the band 10, and may encircle the entire length of the band 10. In other embodiments, the wire loop 20 may only be present in a portion of the band 10 or block 120 and not in the entire length. The wire loop 20 may be made from a ferrous wire material, such that it may be detected by a metal detector. If such a wire loop 20 is used in the band 10, the band 10 may be detected in the event of loss of a portion of the band 10 in the meat product.

As discussed previously, FIG. 5 depicts a carcass 60 hanging from a shackle or a trolley 64 riding along a meat processing line 66. A band 10 of one embodiment of the invention has been placed over a hind leg 62 of the carcass 60, although this band 10 could also be placed over a gambrel or other support used for suspension of the carcass 60. Positioned along the meat processing line 66 is an RFID tag reader 68. As noted above, any type of RFID tag reader 68 may be used within the scope of the invention. The RFID tag reader 68 may read information from the RFID tag 12 on the band 10 from a suitable distance depending on the type of RFID tag 12 and RFID tag reader 68 used, as depicted in FIG. 5. A bar code scanner or reader 70 may also be positioned along the meat processing line 66. Such a bar code scanner 70 may be used to read the information from the bar code identification 22 on the band 10. As depicted in FIG. 5, the bar code scanner 70 may be placed within a proximate distance of the band 10 to read information from the bar code identification 22 on the band 10. In other embodiments, a hand-held bar code scanner 70 is used to read the information from the bar code identification 22. The bar code scanner 70 may be any type of bar code scanner used by those skilled in the art.

In one embodiment, information read using the RFID tag reader 68 or the bar code scanner 70 is stored in a database and processor 75. The database and processor 75 may be any type of computer or computer system known to those skilled in the art, and it may save identification and tracking information for the carcasses 60 moving along the meat processing line 66. The RFID tag reader 68 or the bar code scanner 70, or both, may be connected to the database and processor 75 by any type of connection known to those skilled in the art, including a wireless network or a direct connection. In addition, a server 77 or other computer system, which may be a corporate computer system, may be integrated with the database and processor 75 such that all of the information relating to the carcasses 60 may be stored collectively for analysis. The server 77 may be any type of computer system, and the server 77 may be located off site or within the slaughterhouse facility. In one embodiment, one or more of the RFID tag reader 68, the bar code scanner 70, the database and processor 75 and the server 77 are used with the block 120 coupled to the trolley 122 (which supports a carcass 60), as shown in FIG. 8.

In a method of the invention using an embodiment of the band 10, the band 10 may be placed around a limb of a carcass 60. As noted above, the band 10 may be placed over the limb of the carcass 60 either before or after the carcass 60 has been attached to a shackle 64. In the embodiment of the present invention using the block 120, the block 120 is pressed onto the trolley 122, either before or after the carcass has been attached. As the carcass 60 moves along the meat processing line 66, the RFID tag reader 68 may read the information from the RFID tag 12 on the band 10 or block 120. If a read-write tag is used, data collected at each reading station may also be written to the RFID tag 12 for storage. Such information may include the carcass weight, ambient conditions, an ear tag number, source and lot information, grade information, and inspection data. In one embodiment, the information stored directly on the RFID tag 12 includes the weight of the carcass and the carcass number. In another embodiment, the information stored directly on the RFID tag 12 further includes the ear-tag number. The carcass weight and ear-tag number are discussed in further detail below. The storage of this information directly on the RFID tag 12 removes the need for a printed carcass tag containing this information. Printed carcass tags in the prior art lack the durability of the RFID tag and also have a tendency to detach from the carcass 60. Storing this information on the RFID tag 12, therefore, provides a significant advantage over the use of a printed carcass tag.

Figure 10:
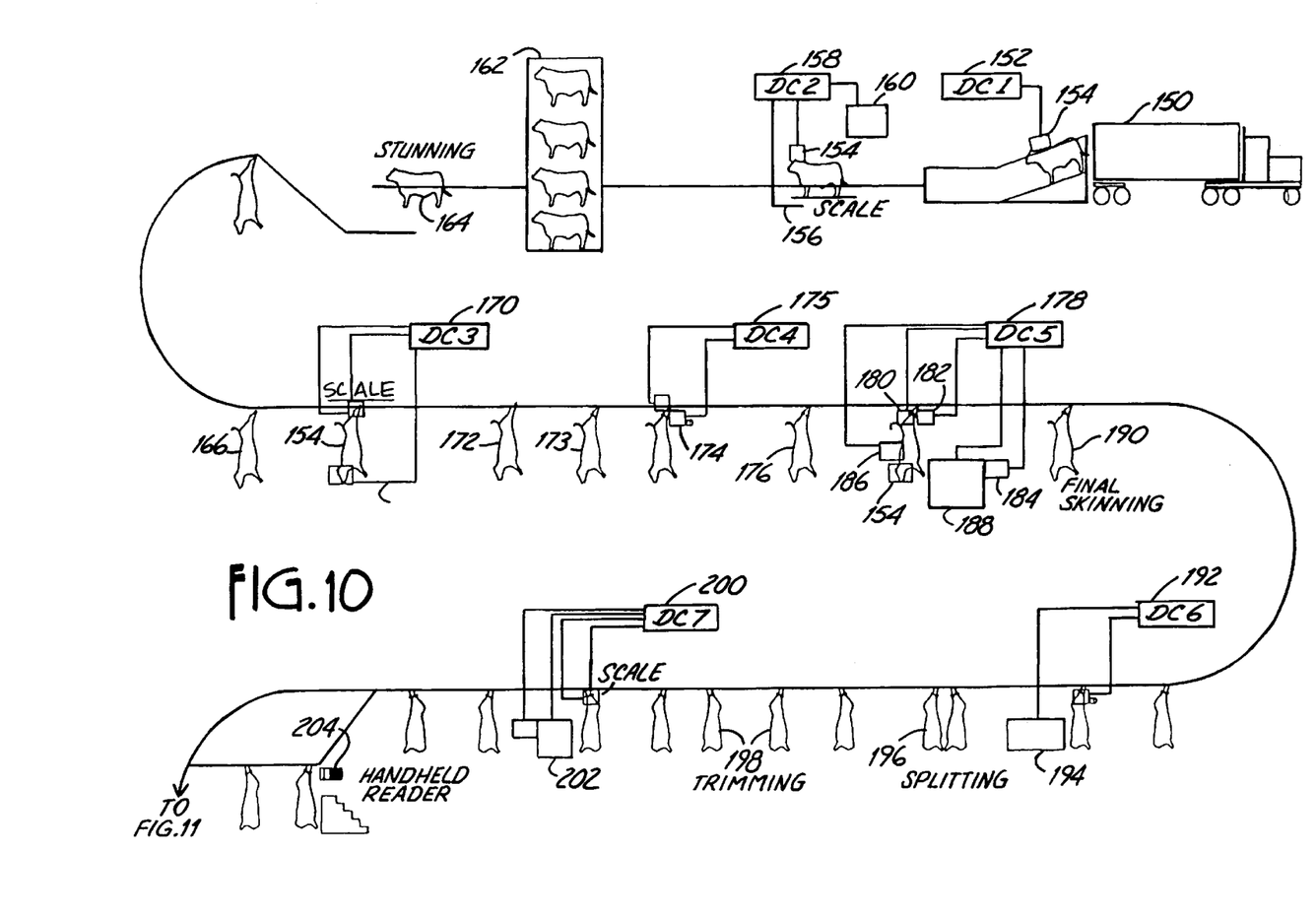
FIG. 10 is a flow chart depicting the areas in which the data collection may be conducted in an embodiment of the present invention.
Figure 11:
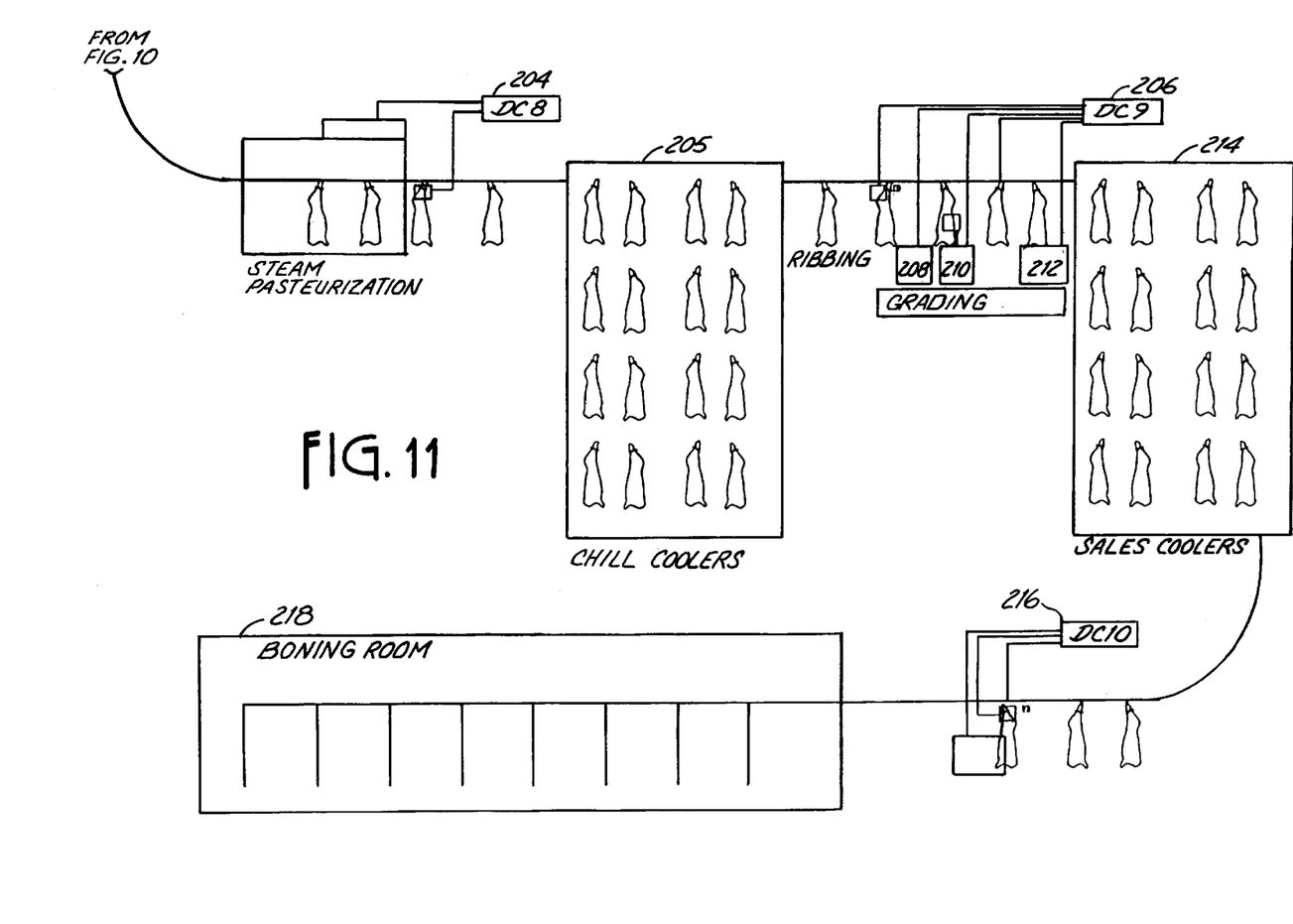
FIG. 11 is a second flow chart depicting the areas in which the data collection may be conducted in an embodiment of the present invention.

FIGS. 10 and 11 depict locations throughout a slaughterhouse at which carcass information may be processed. Certain standards, such as those set by the Canadian Cattle ID Agency, may mandate that carcasses be identified and tracked up to a certain point (typically inspection) in a slaughterhouse. Typically, cattle or other animals have ear tags, which may contain RFID tags or bar codes in some embodiments, attached at the time of slaughter. The ear tags may contain information such as the producer of the animal, the animal's age, sex, and type of animal. Referring now to FIG. 10, when an animal arrives at the slaughterhouse facility (numeral 150), an initial ear tag data collection point 152 can be used to collect information about the animal, such as its age, sex, and producer, from the animal's ear tag 154. The animal is then commonly weighed (numeral 156) and weight information is collected and collated with the ear tag 154 for the animal, at the second data collection point 158. In one embodiment, a display screen 160 is used to display information about the animal to an operator.

The animals are then collected in pens (block 162), before stunning (numeral 164). After stunning (numeral 164), the animal is attached to a trolley or gambrel and the band 10 or block 120, is secured to the limb of the animal or to the gambrel or trolley, and the ear tag number or identification is matched up with the specific band 10 or block 120 used for that animal. In one embodiment a single band 10 or block 120 is used at this point, and in another embodiment, two bands 10 or blocks 120 are used, one for each leg of the animal. In one embodiment, a separate shackle tag is used at this point. In one embodiment, an ear tag 154 with an RFID tag is scanned with an RFID reader and that information is then written to the band 10 or block 120, which may contain an RFID tag. In one embodiment, using a read-only RFID tag, the information from the ear tag 154 is associated with the RFID tag number and stored in a separate database.

In one embodiment, after bleeding 166, the weight of the animal is read a second time (numeral 168), and information related to the weight is collected (block 170) and collated with the ear tag 154 and with the band 10 or block 120 used for the animal. This information is then stored either on the RFID tag or in a separate database. The animal is then subjected to a skinning operation 172, and the first leg of the animal is typically hung from a trolley (numeral 173). In one embodiment, a band 10 or block 120 is applied to a first leg or first trolley at this point. In one embodiment, information related to the animal is read from a shackle reader (numeral 174), after skinning of the animal. In one embodiment, this information is then collected (block 175) and collated with the ear tag 154 and with the RFID tag, for storage. This data collection step is necessary only if some needed information has been previously stored using a shackle tag. Next, the second leg of the animal is typically hung from a trolley (numeral 176). In one embodiment, at this point a second band 10 or block 120 is added to the second leg or to the second trolley.

In one embodiment, lot information and CCS information for the animal is then collected (block 178). In one embodiment, this data collection station includes two RFID tag readers 180 and 182 (one for each leg of the animal) and an ear tag reader 184. In one embodiment, this data collection point also includes an ultrasound device 186 for taking measurements relating to the meat content of the carcass. In another embodiment, this data collection point further includes an input/output device 188 to allow an operator to manually enter data for storage and to provide a visual display of information to the operator.

At some point along the meat processing line, final skinning is performed (numeral 190), and the head of the animal is removed, so information from the ear tag 154 is finally collated with the band 10 or block 120, at this data collection point (block 178). Ear tags 154 and bands 10 or block 120 may be matched manually or automatically with RFID tags or bar codes, as explained above.

In one embodiment, information related to the inspection of the animal, which could include health information and cleanliness information, is written to the band 10 or block 120 or stored on the database and processor 75 in association with the RFID tag number, at another data collection point (block 192) along the meat processing line. In one embodiment, this data collection point includes an input/output device 194 for displaying information regarding the carcass to the operator and for allowing the operator to manually enter information for storage. The animal is then typically subjected to splitting (numeral 196) and trimming (numeral 198). After the animal has been dressed, in one embodiment, each side of the carcass of the animal is weighed, and this weight information is written to (or associated with) the band 10 or block 120 at another data collection point (block 200). In one embodiment, this data collection point includes an input/output device 202 for displaying information regarding the carcass to the operator and for allowing the operator to manually enter information for storage. In addition, information related to trimming or cutting performed on the carcass to clean or prepare it may also be written to the band 10 or block 120 through manual or electronic methods. In one embodiment, a handheld reader 204 is used to read or write data to the band 10 or block 120, for a carcass side, prior to steam pasteurization.

FIG. 11 shows a second portion of a typical meat processing line. As shown in FIG. 11, data may be written to the band 10 or block 120, relating to the cleaning of the carcass, such as at a steam pasteurization system along the meat processing line, at another data collection point (block 204). Such information may include the temperature reached in the pasteurization system and the length of time for which it was reached. Such information may be useful for quality control. The carcass sides then typically enter a chill cooler (block 205) to reduce the carcass temperature. Data may also be written to the band 10 or block 120 at another data collection point (block 206), located at a grading stand along the meat processing line. Such information may include data from a CCS grade entry screen (block 208), a vision grading system (block 210), and from other methods known to those skilled in the art. In one embodiment, this data collection point includes an input/output device 212 for displaying information regarding the carcass to the operator and for allowing the operator to manually enter information for storage.

The carcass sides are then typically placed in a sales cooler (block 214). Before the carcass is broken down into packaged meat, information about the weight of the carcass may be read and written to the band 10 or block 120, at another data collection point (block 216). By recording a variety of information relating to carcasses along the meat processing line, information that aids in assuring quality and efficient meat processing may be easily preserved. Such information may be gathered in a central server 77 (shown in FIG. 5) for processing. The carcass sides then typically proceed to the boning room (block 218).

At each of the stations described above, with reference to FIGS. 10 and 11, the data or information collected is either stored directly on the tag (if the RFID tag 12 is a read-write tag) or on the database and processor 75 (shown in FIG. 5) in association with the RFID tag identification number. In one embodiment, some of the information collected is stored directly on the read-write RFID tag 12, and all of the information collected is stored on the database and processor 75.

The RFID tags 12 are removed from the carcass 60 in the boning room (block 218). In one embodiment of the present invention, as discussed above, the band 10 or block 120 and the RFID tag 12 are adapted to be reusable. In this embodiment, the removed RFID tags 12 are returned to the application location in the meat processing line (numerals 173 and 176 in FIG. 10) for attachment to the next carcass 60. Prior to attachment to the carcass 60, any information stored directly on the RFID tag 12 (in the case of a read-write tag) is erased. In one embodiment, prior to placing the RFID tag 12 on the carcass 60, it is read to verify that it remains operational. If the RFID tag 12 is operational it is attached to the carcass 60, otherwise it is discarded.

Some embodiments of the invention may have one or more advantages over identification and tracking schemes commonly used in meat production facilities. One advantage of an embodiment of the band 10 of the invention is that the band 10 will stay attached to the carcass 60 during processing. The band 10 will not, for example, fall off of the carcass 60 or be stripped from the carcass 60 during processing of the carcass 60, as may occur if a pin or other attachment device is used to attach information to a carcass 60. In addition, the band 10 may stay attached to the carcass 60 if the carcass 60 is transferred from a first shackle or trolley to a second shackle or trolley, and the band 10, therefore, has the advantage of remaining attached to the carcass 60 if multiple shackles or trolleys are used in a meat processing facility. The band 10, therefore, will more closely track the carcass 60 rather than the conveying system in the meat production facility.

Another advantage of one embodiment of the band 10 of the invention is that the RFID tag 12 will not become obscured with material as may occur with a vision-based system. The band 10 of the invention, therefore, may be more reliable and may require less maintenance than a vision-based system. The band 10 of the invention may be used during commercial meat production in which carcasses 60 typically move along a single chain or line at a rate of 300 to 600 head per hour. The bands 10, therefore, may be quickly and easily placed over a limb of a carcass 60 at the speed of the meat processing line 66. In an embodiment of the band 10 having a frusto-conical shape, the band 10 may accommodate various animals and limbs of different proportions and may also be self-tightening or shaped to securely and smoothly fit on a limb of the carcass 60. Yet another advantage, in an embodiment of the band 10 which is made from a non-metallic or plastic material, is that the RFID tag 12 may be more easily read than if a metal background to an RFID tag 12 is used. For instance, if an RFID tag is attached to a metal trolley, it may be more difficult to read the RFID tag than if a plastic or non-metallic background to the RFID tag is used.

Embodiments of the present invention may be used during meat production of any type of animal, including all age classes of bovine, porcine, and ovine animals. Although portions of this detailed description depict and describe embodiments of the invention dealing with beef or beef carcasses, these references to beef should not be read to limit the invention to the production of only beef products. Rather, this specification should be read as being of use for the commercial meat production from any type of animal.

While the present invention has been described with reference to several embodiments thereof, those skilled in the art may recognize various changes that may be made without departing from the spirit and scope of the claimed invention. For example, the band 10 may be available in selected sizes or it may be adjustable, i.e., the inside diameter or area may be varied, and in one embodiment the band 10 may be provided with a "telescoping" portion. Accordingly, this invention is not limited to what is shown in the drawings and described in the specification but only as indicated in the attached claims. Any numbering or ordering of the elements in the following claims is merely for convenience and is not intended to suggest that the ordering of the elements of the claims has any particular significance other than that otherwise expressed by the language of the claims.

We claim:

1. A device for identifying a carcass hanging from a trolley, during meat production along a meat processing line, the device comprising:
    a block adapted to couple to a frame of the trolley, the block including a base and two generally parallel arms defining a notch configured to surround the frame; and
    a readable identification tag coupled to the block for remote identification of the carcass.

2. The device of claim 1 wherein the readable identification tag is an RFID tag.

3. The device of claim 2 further including a second RFID tag coupled to the block.

4. The device of claim 2 wherein one of the arms includes a compartment for housing the RFID tag.

5. The device of claim 2 wherein the RFID tag is a passive RFID tag.

6. The device of claim 5 wherein the passive RFID tag includes an identification number.

7. The device of claim 2 wherein the RFID tag is an active RFID tag adapted for storing information.

8. The device of claim 7 wherein the RFID tag operates at a frequency of about 13.56 megahertz.

9. The device of claim 7 wherein the RFID tag operates at a frequency of about 2.45 gigahertz.

10. The device of claim 1 wherein the RFID tag is embedded in the block.

11. The device of claim 1 wherein the arms extend substantially the entire distance along a first and a second opposing edge of the base and are disposed generally perpendicular to the base.

12. The device of claim 11 wherein each of the arms includes a finger extending substantially the entire distance along the corresponding arm and extend generally parallel to the base, the fingers having an angled edge such that when the block contact the trolley frame, the opposing arms separate allowing the frame to mate with the notch.

13. The device of claim 1 wherein the base defines a generally central opening adapted to accept an axle of the trolley.

14. The device of claim 1 wherein the block includes a barcode identification for identification by a bar code reader.

15. The device of claim 1 further comprising a temperature sensor or a humidity sensor coupled to the block.

16. The device of claim 1 further comprising a biosensor coupled to the block, the biosensor adapted to detect the presence of a specified biological organism.

17. The device of claim 1 further comprising a supplemental fastener for further coupling the block to the trolley.

18. The device of claim 1 wherein the block is made from a plastic material.

19. The device of claim 18 wherein the plastic material is selected from the group consisting of: polyethylene, acetyl, polypropylene, and nylon.

20. A device for tracking a carcass hanging from a trolley, during meat production along a meat processing line, the device comprising a block adapted to couple to a frame of the trolley, the block including a housing and two generally parallel arms defining a trolley notch adapted to couple to the frame, and an RFID tag coupled to the block.

21. The device of claim 20 wherein the housing includes first and second fingers extending laterally across the housing, the fingers having a leading edge having an angle sufficient to allow the frame to cause the fingers to separate and engage the frame.

22. The device of claim 20 wherein the housing defines an opening adapted to accept an axle of the trolley such that when engaged the block is restricted from moving longitudinally along the frame.

23. The device of claim 20 wherein the trolley notch is disposed closer to a first end than to a second end of the housing.

24. The device of claim 23 wherein the RFID tag is embedded within the housing near the second end.

25. The device of claim 20 wherein the block includes a barcode identification for identification by a bar code reader.

26. The device of claim 20 further comprising a temperature sensor or a humidity sensor coupled to the block.

27. The device of claim 20 further comprising a biosensor coupled to the block, the biosensor adapted to detect the presence of a specified biological organism.

28. The device of claim 20 further comprising a supplemental fastener for further coupling the block to the trolley.

29. The device of claim 20 wherein the block is made from a plastic material.

30. The device of claim 29 wherein the plastic material is selected from the group consisting of: polyethylene, acetyl, polypropylene, and nylon.

31. The device of claim 20 wherein the RFID tag is a passive RFID tag.

32. The device of claim 20 wherein the RFID tag is an active RFID tag adapted for storing information.

33. The device of claim 32 wherein the RFID tag operates at a frequency of about 13.56 megahertz.

34. The device of claim 32 wherein the RFID tag operates at a frequency of about 2.45 gigahertz.

* * * * *